Patented Nov. 15, 1927.

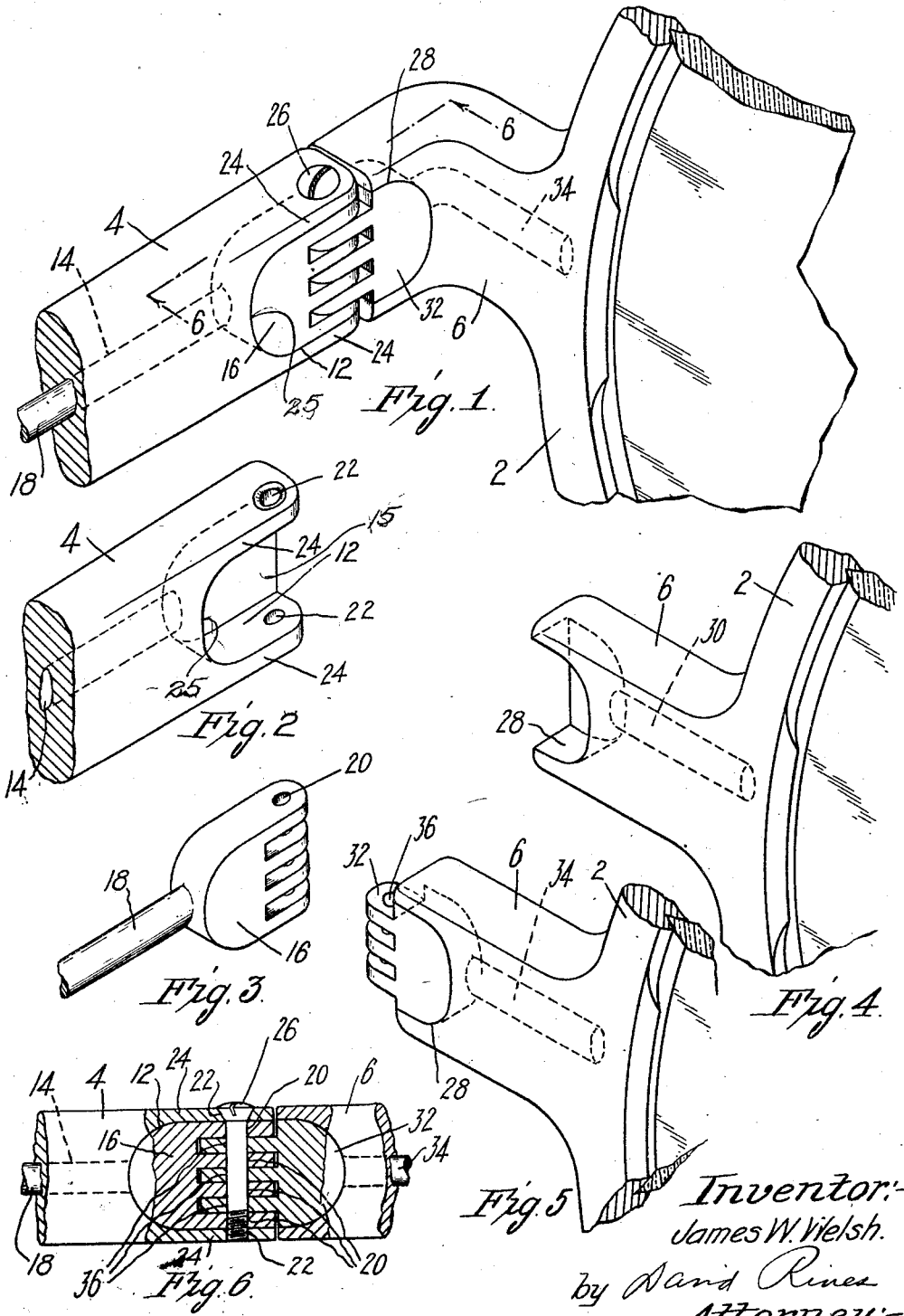

1,649,792

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING AND METHOD.

Application filed August 21, 1922. Serial No. 583,203.

The present invention relates to ophthalmic mountings, particularly mountings of the non-metallic type.

The chief object of the invention is to improve upon present-day hinge connections between the fronts and the temples of ophthalmic mountings of the above-described character. Other objects will appear hereinafter.

Figure 7:
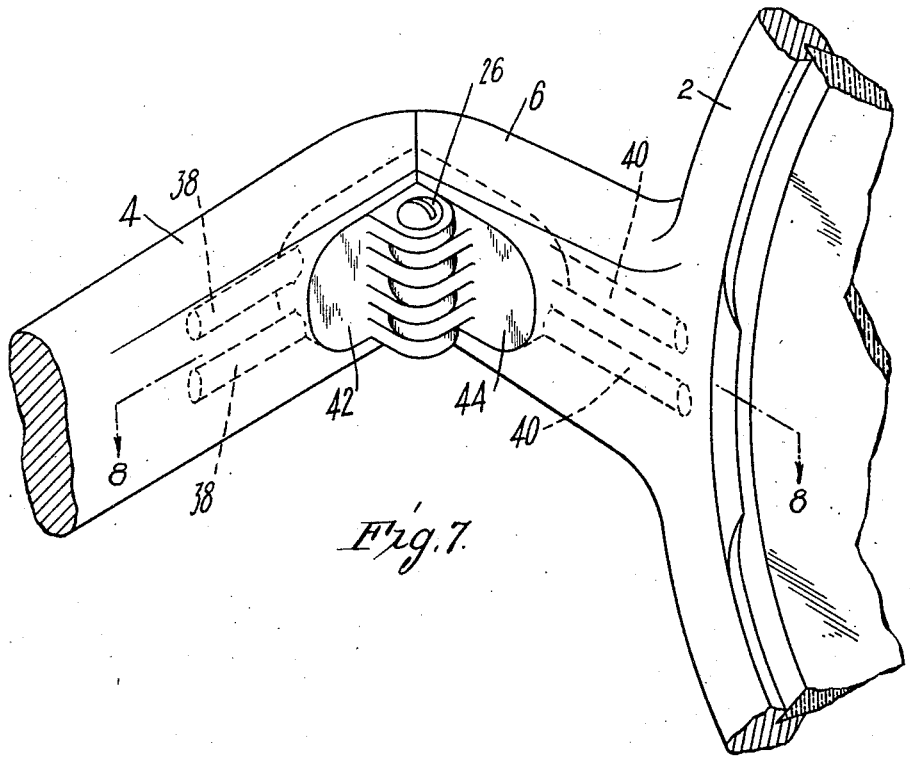
Figure 8:
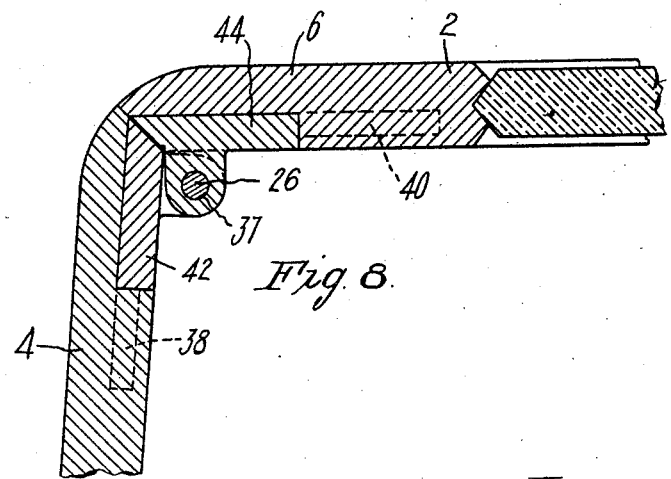

In the accompanying drawings, Fig. 1 is a fragmentary perspective view of an ophthalmic mounting constructed according to a preferred embodiment of the present invention; Figs. 2, 3, 4 and 5 are similar perspective views, illustrating a preferred method of making the mounting of the present invention; Fig. 6 is a longitudinal section of the mounting shown in Fig. 1, taken upon the line 6—6 of Fig. 1, looking in the direction of the arrows; Fig. 7 is a view similar to Fig. 1 of a modification; and Fig. 8 is a section taken as upon the line 8—8 of Fig. 7, looking in the direction of the arrows.

Non-metallic mountings of the character illustrated in the drawings of the present application are usually constituted of a non-metallic front 2 and non-metallic temples 4. The temples are hinged at their forward ends to end pieces 6 of the front 2.

The preferred temple is provided with a recess 12 and a longitudinal bore 14 leading into the recess 12. The recess is proivded with a bottom wall 15 and two walls 24 that are disposed at opposite sides of the bottom wall. A hinge element is mounted on the temple, comprising a hinge plate 16 seated in the recess 12 in engagement with the bottom wall, and a rod 18 mounted in the bore 14. The hinge element is removably mounted on the temple. To this end, it is provided with an opening 20 that alines with openings 22 provided in opposite walls 24 of the recess 12. The walls 24 are joined by a connecting wall 25 and the hinge plate has portions in contact with the walls 24 and the connecting wall 25. A removable screw 26 or equivalent member extends through the hinge plate and the temple, being mounted in the openings. To remove the hinge element, therefore, all that is necessary is to remove the screw 26.

The end piece 6 of the front 2, originally straight, as shown in Fig. 4, is similarly provided with a recess 28. A similar hinge element has a hinge plate 32 seated in the recess 28 and a rod 34 seated in the bore 30. After this last-named hinge element has been mounted, as shown in Fig. 5, the end piece 6, with the hinge element mounted therein, is bent or curved out of the plane of the lens-holding front 2, into the form shown in Fig. 1.

The recess 28 is of somewhat smaller depth than the recess 12, so that the forward portion of the hinge plate 32 projects beyond the end piece 6. This projecting forward portion of the hinge plate 32 is provided with an opening 36 similar to the opening 20 of the hinge plate 16. The same screw 26 may be mounted in this opening 32, serving thus also as a pintle for connecting the hinge plates 16 and 32 together, as will be understood from Figs. 1 and 6.

The openings 20 and 36 are shown in the preferred form as provided in the planes of their hinge elements. This is an advantageous construction with a bent end piece, as will be clear from Fig. 1.

It is not essential, however, that the end piece 6 be bent. It may be straight, as illustrated in Figs. 7 and 8. In that event, the corresponding openings 37 will be out of the general planes of the hinge elements, providing for a butt joint. Not one rod 18 or 34 alone may be employed, but a plurality of rods 38 and 40, as shown in these two figures, integral with the respective hinge plates 42 and 44, and mounted in a corresponding plurality of bores, may be used. In the modification of these figures, the screw 26 is used simply to join the hinge plates 42 and 44 together, and not to secure either hinge element to the mounting in which it is mounted. Other modifications will readily occur to persons skilled in the art, and all such are considered to be within the spirit and scope of the invention, as defined in the appended claims.

A mounting constructed in accordance with the present invention is most efficient, the parts being nicely adjusted, and it is of pleasing appearance, no metal parts being visible when the mounting is viewed from the front.

What is claimed as new is:

1. An ophthalmic mounting comprising a non-metallic mounting having a hinge-plate-receiving recess and a longitudinally disposed bore leading into the recess, and a hinge element comprising a hinge plate seated in the recess and a rod within the bore.

2. An ophthalmic mounting as defined in claim 1 having means extending through the non-metallic mounting and the hinge plate for securing the hinge element in position.

3. An ophthalmic mounting as defined in claim 1 in which the mounting with the rod is bent.

4. An ophthalmic mounting comprising two members, one of the members having a recess and a hinge plate seated in the recess, opposite walls of the recess and the hinge plate being provided with alined openings, and a member mounted in the openings removably securing the hinge plate in the recess, and the other of the two members being hinged to the hinge plate.

5. The method of making an ophthalmic mounting that comprises boring the end piece of a non-metallic lens-holding front, inserting a metal hinge element into the bore, and bending the end piece with the metal hinge element inserted therein out of the plane of the front.

6. An ophthalmic mounting comprising a non-metallic front and a non-metallic temple each provided with a recess, two hinge elements each comprising a plate-like body portion and a perforated knuckle extending from the body portion, the body portions being disposed in the recesses, one of the non-metallic members having two oppositely disposed walls adjacent to the sides of the corresponding recess and each provided with an opening alined with the perforation in the knuckle of the corresponding hinge element, and a hinge pintle disposed in the openings and the perforations.

7. An ophthalmic mounting comprising a non-metallic front and a non-metallic temple each provided with a recess, two hinge elements each comprising a plate-like body portion and a perforated knuckle extending from the body portion, the body portions being disposed in the recesses, the non-metallic temple having two oppositely disposed walls adjacent to the sides of the corresponding recess and each provided with an opening aligned with the perforations in the knuckle of the corresponding hinge element, the knuckle of the other hinge element extending beyond the non-metallic material of the front, and a hinge pintle disposed in the openings and the perforations.

8. A spectacle temple comprising a non-metallic member having a recess provided with a bottom wall, two walls disposed at opposite sides of the bottom wall, and a wall connecting the oppositely disposed walls, a hinge element having a plate-like body portion resting on the bottom wall and having portions in contact with the said two walls and the connecting wall, the hinge element having perforated knuckles, the said two walls having openings alined with the perforations in the knuckles, and a hinge pintle in the perforations and the openings.

In testimony whereof, I have hereunto subscribed my name this 15th day of August, 1922.

JAMES W. WELSH.